United States Patent
Fu et al.

(10) Patent No.: US 12,495,287 B2
(45) Date of Patent: Dec. 9, 2025

(54) GROUP MANAGEMENT FOR V2X GROUPCAST

(71) Applicant: Telefonaktiebolaget LM Ericsson (publ), Stockholm (SE)

(72) Inventors: Zhang Fu, Stockholm (SE); Conny Larsson, Åkersberga (SE); Anders E. Eriksson, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 700 days.

(21) Appl. No.: 17/796,726

(22) PCT Filed: Feb. 3, 2021

(86) PCT No.: PCT/EP2021/052465
§ 371 (c)(1),
(2) Date: Aug. 1, 2022

(87) PCT Pub. No.: WO2021/156270
PCT Pub. Date: Aug. 12, 2021

(65) Prior Publication Data
US 2023/0068833 A1  Mar. 2, 2023

Related U.S. Application Data

(60) Provisional application No. 62/969,433, filed on Feb. 3, 2020.

(51) Int. Cl.
*H04W 8/00* (2009.01)
*H04W 8/18* (2009.01)

(52) U.S. Cl.
CPC ........... *H04W 8/005* (2013.01); *H04W 8/186* (2013.01)

(58) Field of Classification Search
CPC ....... G06F 15/16; G06F 15/173; H04L 12/66; H04L 12/28; H04L 51/18; H04L 51/224; H04B 7/00; G06Q 20/40
See application file for complete search history.

(56) References Cited

U.S. PATENT DOCUMENTS

| | | | |
|---|---|---|---|
| 2014/0269494 A1* | 9/2014 | Zhu ..................... | H04W 40/246 370/328 |
| 2015/0257176 A1* | 9/2015 | Vyas ....................... | H04W 8/20 370/338 |
| 2016/0212780 A1* | 7/2016 | Stojanovski .......... | H04W 8/005 |

FOREIGN PATENT DOCUMENTS

WO    2012170794 A1    12/2012

OTHER PUBLICATIONS

International Search Report and Written Opinion dated Mar. 31, 2021 for International Application No. PCT/EP2021/052465 filed Feb. 3, 2021; consisting of 14 pages.

(Continued)

Primary Examiner — Iqbal Zaidi
(74) Attorney, Agent, or Firm — Weisberg I.P. Law, P.A.

(57) ABSTRACT

A method, system and apparatus for group management for vehicle-to-anything (V2X) and Proximity Based Services (ProSe) groupcast. According to one aspect, a method in a wireless device (WD) includes discovering wireless devices (WDs) that are members of a group, and sending to the WDs that are members of the group a group discovery complete message. According to another aspect, a method in a WD includes listening for a group discovery signal indicating a group to which the WD belongs or seeks to join, and sending a group discovery response indicating that the WD seeks to join or remain in the indicated group.

16 Claims, 9 Drawing Sheets

(56) References Cited

OTHER PUBLICATIONS

3GPP TR 23.752 V0.3.0; 3rd Generation Partnership Project; Technical Specification Group Services and System Aspects; Study on system enhancement for Proximity based Services (ProSe) in the 5G System (5GS) (Release 17); Jan. 2020; consisting of 73 pages.
3GPP TS 23.287 V16.1.0; 3rd Generation Partnership Project; Technical Specification Group Services and System Aspects; Architecture enhancements for 5G System (5GS) to support Vehicle-to-Everything (V2X) services (Release 16); Dec. 2019; consisting of 51 pages.
SA WG2 Meeting #136AH S2-2001667; revision of S2-2001523 of S2-2001447 of S2-2000348; Title: Updates to Solution #4; Source: LG Electronics; Document for: Approval; Agenda Item: 8.6; Work Item/Release: FS_5G_ProSe / Rel-17; Date and Location: Jan. 13-17, 2020, Incheon, Korea; consisting of 6 pages.
European Communication Pursuant to Article 94(3) dated Jun. 11, 2025 issued in corresponding European Patent Application No. 21 703 643.3, consisting of 5 pages.

* cited by examiner

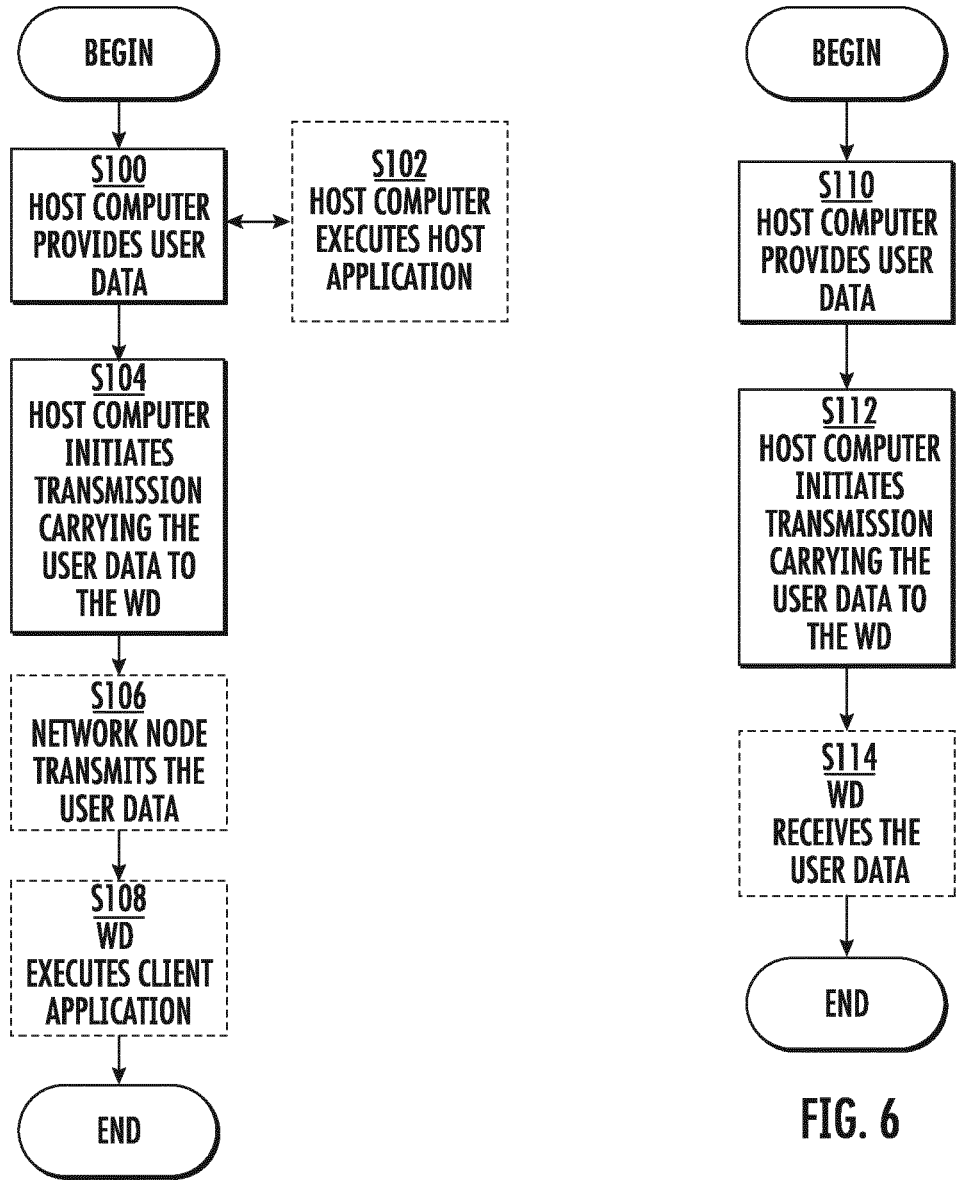

GROUP MANAGEMENT FOR V2X GROUPCAST

CROSS-REFERENCE TO RELATED APPLICATIONS

This application is a Submission Under 35 U.S.C. § 371 for U.S. National Stage Patent Application of International Application No.: PCT/EP2021/052465, filed Feb. 3, 2021 entitled "GROUP MANAGEMENT FOR V2X GROUPCAST," which claims priority to U. S. Provisional Application No.: 62/969,433, filed Feb. 3, 2020, entitled "GROUP MANAGEMENT FOR V2X GROUPCAST," the entireties of both of which are incorporated herein by reference.

TECHNICAL FIELD

The present disclosure relates to wireless communications, and in particular, to group management for vehicle-to-anything (V2X) groupcast communications. The disclosure also relates to proximity based services (ProSe).

BACKGROUND

The Third Generation Partnership Project (3GPP) develops standards for wireless communications including the current Long Term Evolution (LTE) standard, also known as Fourth Generation (4G), and the New Radio (NR) standard, also known as Fifth Generation (5G). Included in standards developed by the 3GPP is Technical Standard (TS) 23.287 v. 1.0, which pertains to V2X communication. In particular, ¶6.3.2 of 3GPP TS 23.287 specifies a groupcast mechanism. A groupcast mechanism is a procedure for one device to broadcast a signal to other devices that are members of a group that is distinguished by a group identification (ID).

FIG. 1 illustrates an example V2X communication scenario where a vehicle 2 is in communication with any one or more of a plurality of objects having a wireless device (WD). Such objects may include, for example, another vehicle 4, electronic equipment 6, a cell phone or other portable wireless device 8 or an office location within a building 10. Electronic equipment 6 may include, for example, stationary equipment or mobile equipment that sends information to, or receives information from, the vehicle 2. This information may include, for example, control information and/or vehicle information. Also, a network node 16 (such as a base station) is in communication with the vehicle 2 and other devices 4, 6, 8 and 10. For example, the network node 16 may be a base station such as a gNB or eNB.

The 3GPP procedure for establishing groupcast communication is shown in FIG. 2. In step S10, group management is carried out in the V2X application layer. Group management includes a collection of procedures for management of traffic between devices in a group. In step S12, the V2X application layer may provide information for PC5 group communication. PC5 includes a sidelink communication protocol (a set of rules) for communication between wireless devices (WDs). In step S13, the transmitting WD determines source and/or destination layer-2 IDs. In step S14, the V2X service is groupcast to be received by devices that are members of the group.

Steps S10 and S12 of the group management procedure shown in FIG. 2 are implemented in the V2X application layer, whereas steps S13 and S14 are implemented in the underlying V2x layer. Implementing these steps in different layers makes it difficult to coordinate and optimize the overall group management procedure.

SUMMARY

Some embodiments advantageously provide methods, and wireless devices for performing group management for V2X and proximity based services (ProSe) groupcast communications. In some embodiments, a group management procedure is integrated with a groupcast communication procedure. In some embodiments, a groupcast message announces the completion of the groupcast management. The groupcast message may include a list of the members of the group that have been admitted during the group management procedure. An advantage of integrating the group management procedure with the groupcast communication procedure is that these procedures can more easily be coordinated and jointly optimized.

According to one aspect, a WD configured to communicate with another device includes a radio interface and/or processing circuitry configured to discover other WDs that are members of a group and send to the other WDs that are members of the group a group discovery complete message.

According to this aspect, in some embodiments, the discovering and the sending are performed in a same application layer. In some embodiments, the group discovery complete message includes a list of the members of the group. In some embodiments, the processing circuitry is further configured to determine when a group discovery message corresponding to a group discovery message is received within a predetermined time after sending the group discovery message. In some embodiments, the radio interface is further configured to send a group cancellation message to cancel the discovering. In some embodiments, the group discovery message is included in a groupcast data message. In some embodiments, the processing circuitry is further configured to receive discovery response messages from the other WDs.

According to another aspect, a method implemented in a WD, includes discovering other WDs that are members of a group and sending to the other WDs that are members of the group a group discovery complete message.

According to this aspect, in some embodiments, the discovering and the sending are performed in a same application layer. In some embodiments, the group discovery complete message includes a list of the members of the group. In some embodiments, the method further includes determining, via the processing circuitry, when a group discovery response message is received within a predetermined time after sending the group discovery message. In some embodiments, the method includes sending, via the radio interface, a group cancellation message to cancel the discovering. In some embodiments, the group discovery message is included in a groupcast data message. In some embodiments, the method further includes receiving discovery response messages from the other wireless devices.

According to yet another aspect, a WD configured to communicate with another device includes a radio interface and/or processing circuitry configured to listen for a group discovery signal indicating a group to which the other WD belongs or seeks to join, sending a group discovery response indicating that the other WD seeks to join or remain in the indicated group, and receiving a group discovery completion message.

According to this aspect, in some embodiments, when the WD does not receive a group discovery completion message within a predetermined time after the WD sends the group discovery response, the WD will clear a state for the indicated group. In some embodiments, the processing circuitry is further configured to discover other WDs that are members of another group different from the group to which the WD belongs or seeks to join. In some embodiments, the radio interface and/or processing circuitry is further configured to receive a cancellation message from another WD 22*a* and to clear a state for the indicated group in response to the received cancellation message.

According to another aspect, a method implemented in a WD includes listening, via the radio interface and processing circuitry, for a group discovery signal indicating a group to which the WD belongs or seeks to join, sending a group discovery response indicating that the WD seeks to join or remain in the indicated group, and receiving a group discovery completion message.

According to this aspect, in some embodiments, when the WD does not receive a group discovery completion message within a predetermined time after the WD sends the group discovery response, the WD will clear a state for the indicated group. In some embodiments, the method further includes discovering other WDs that are members of another group different from the group to which the WD belongs or seeks to join. In some embodiments, the method also includes receiving a cancellation message from another WD and to clear a state for the indicated group in response to the received cancellation message.

According to yet another aspect, a computer program product embodied in a non-transitory computer readable medium is provided. The computer readable medium stores computer code executable by a processor to cause the processor to: discover wireless devices, WDs, that are members of a group, send to the WDs that are members of the group a group discovery complete message.

According to this aspect, in some embodiments, the group discovery complete message includes a list of the members of the group. In some embodiments, the computer code is further executable by the processor to cause the processor to determine when a group discovery response message corresponding to a group discovery message is received within a predetermined time after sending the group discovery message. In some embodiments, the computer code is further executable by the processor to cause the processor to send a group cancellation message to cancel the discovering. In some embodiments, the group discovery message is included in a groupcast data message. In some embodiments, the computer code is further executable by the processor to cause the processor to receive discovery response messages from the wireless devices.

According to another aspect, a computer program product embodied in a non-transitory computer readable medium is provided. The computer readable medium stores computer code executable by a processor to cause the processor to: listen for a group discovery signal indicating a group to which a WD belongs or seeks to join, send a group discovery response indicating that the WD seeks to join or remain in the indicated group, and receive a group discovery complete message.

According to this aspect, in some embodiments, the computer code is further executable by the processor to cause the processor to clear a state for the indicated group when the WD does not receive a group discovery completion message within a predetermined time after the WD sends the group discovery response. In some embodiments, the computer code is further executable by the processor to cause the processor to discover other WDs that are members of another group different from the group to which the WD belongs or seeks to join. In some embodiments, the computer code is further executable by the processor to cause the processor to receive a cancellation message from another WD and to clear a state for the indicated group in response to the received cancellation message.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating example methods implemented in a communication system including a host computer, a network node and a wireless device for executing a client application at a wireless device according to some embodiments of the present disclosure;

FIG. 6 is a flowchart illustrating example methods implemented in a communication system including a host computer, a network node and a wireless device for receiving user data at a wireless device according to some embodiments of the present disclosure;

DETAILED DESCRIPTION

Figure 1:
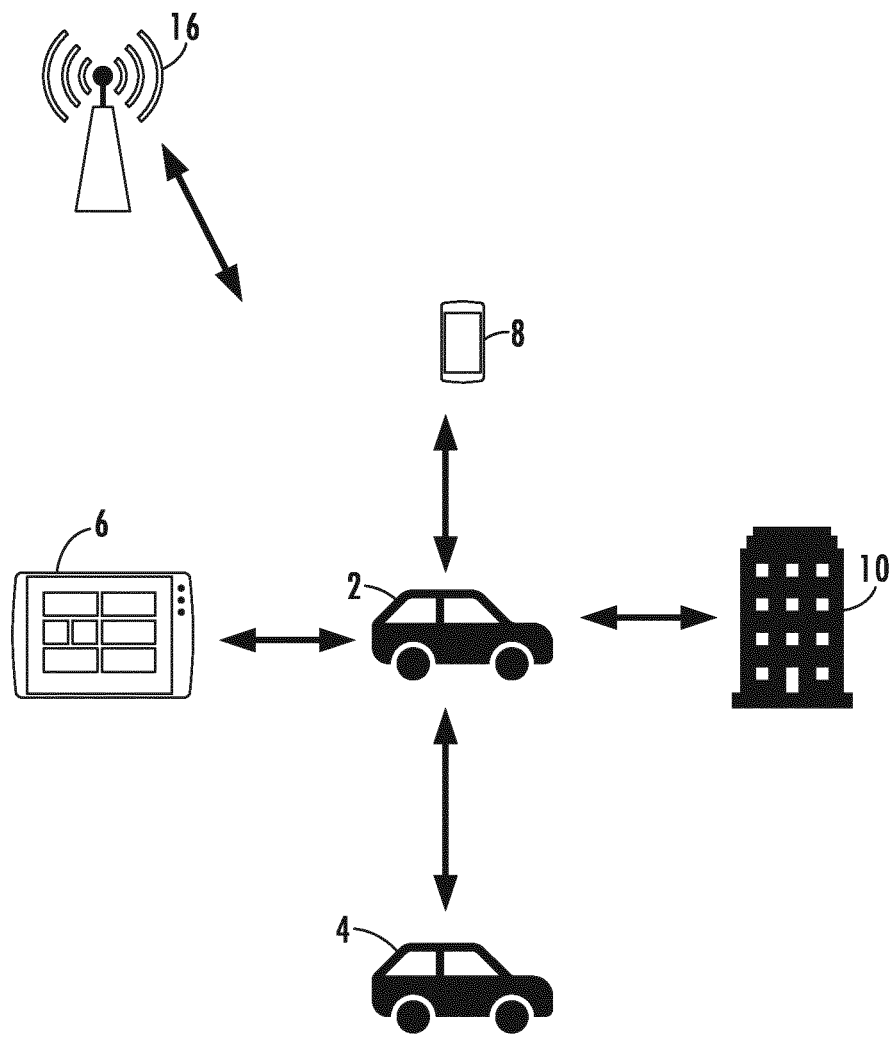
FIG. 1 shows an example V2X scenario.
Figure 2:
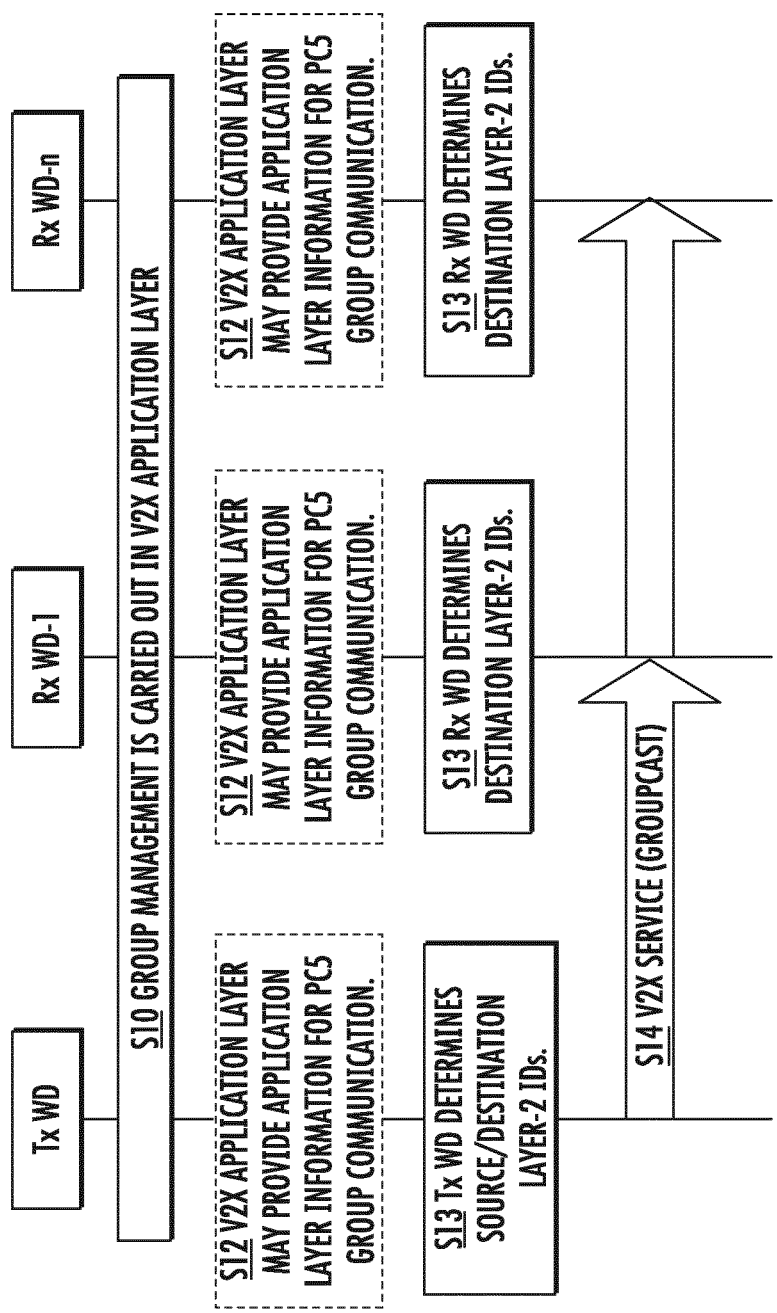
FIG. 2 is a diagram of steps in a known group management procedure.

Before describing in detail example embodiments, it is noted that the embodiments reside primarily in combinations of apparatus components and processing steps related to performing group management for V2X groupcast communications. Embodiments are also applicable to proximity based services (ProSe). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Proximity based services (ProSe) refer to a device-to-device (D2D) technology that allows wireless devices (WDs) to detect each other and to communicate directly. Communication between WDs that are within range may involve the use of a sidelink channel.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A method and wireless device for group management for vehicle-to-anything (V2X) groupcast are disclosed. According to one aspect, a method in a WD includes discovering wireless devices (WDs) that are members of a group, and sending to the WDs that are members of the group a group discovery complete message. According to another aspect, a method in a WD includes listening for a group discovery signal indicating a group to which the WD belongs or seeks to join, and sending a group discovery response indicating that the WD seeks to join or remain in the indicated group.

Figure 3:
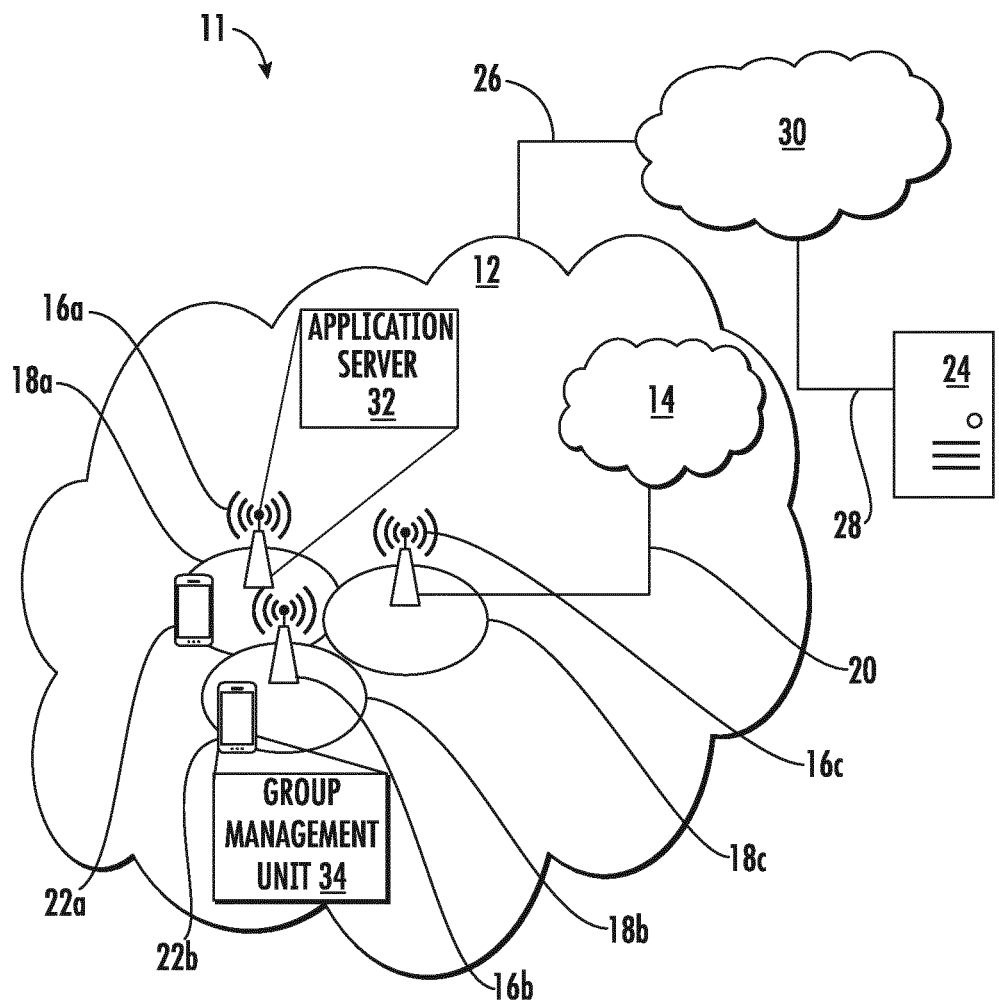
FIG. 3 is a schematic diagram of an example network architecture illustrating a communication system connected via an intermediate network to a host computer according to the principles in the present disclosure.

Returning again to the drawing figures, in which like elements are referred to by like reference numerals, there is shown in FIG. 3 a schematic diagram of a communication system 11, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Figure 4:
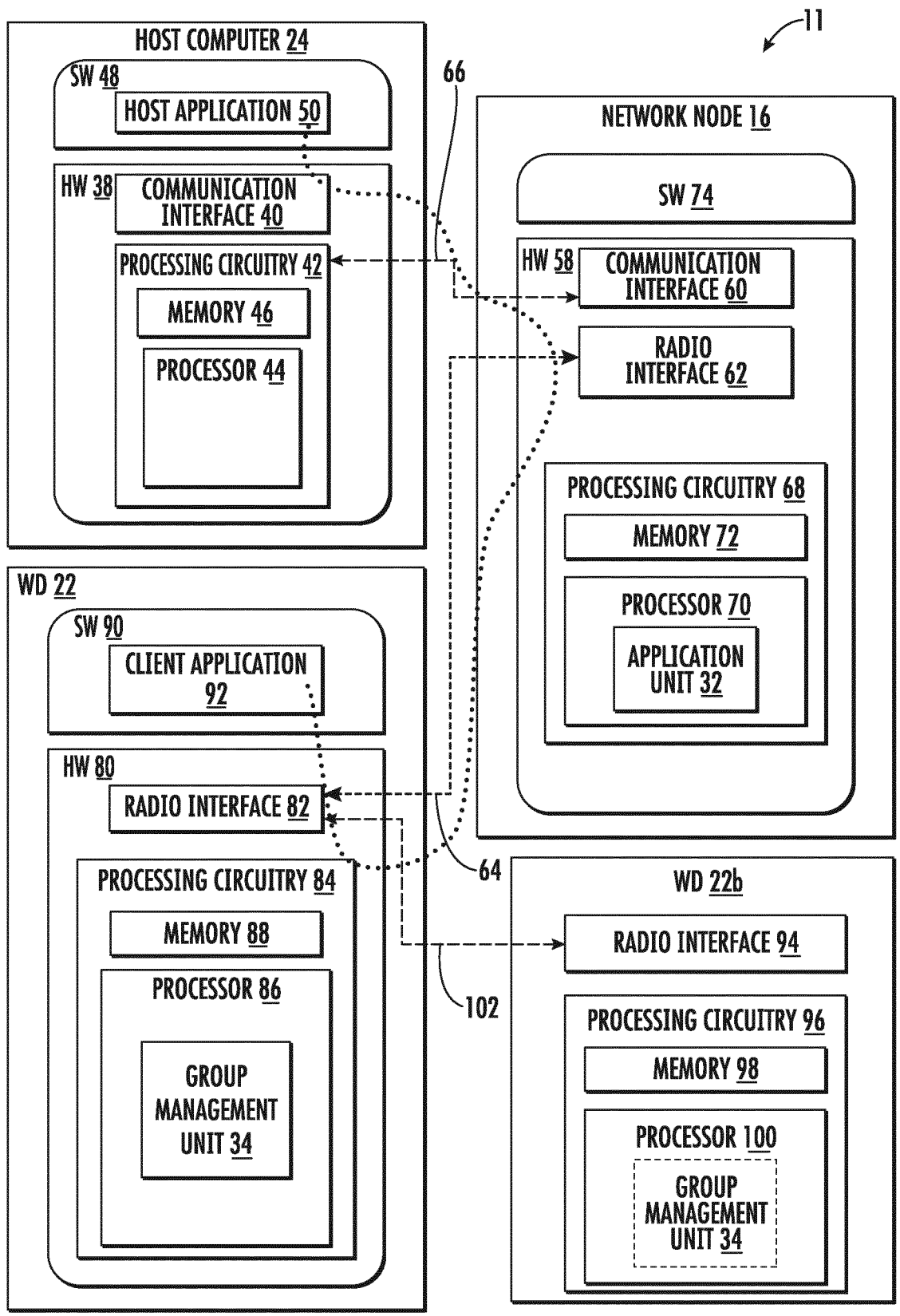
FIG. 4 is a block diagram of a host computer communicating via a network node with a wireless device over an at least partially wireless connection according to some embodiments of the present disclosure.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN. Further, in some embodiments, a WD 22*a* can communicate directly with WD 22*b* by transmitting and receiving sidelink control information (SCI) as well as data, voice, video or other information. This side link is shown in FIG. 4 as link 102.

The communication system 11 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 11 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A wireless device 22 may be configured to include a group management unit 34 which is configured to discover WDs that are members of a group and send to the WDs that are members of the group a discovery complete message. The network node 16 may be configured to include an application server 32 to provide, among other things, a group IP and destination L2 ID for the group. Some or all of the functions of the application server 32 may be performed by the WD 22 instead of or in addition to the network node 16.

Example implementations, in accordance with an embodiment, of the WDs 22, network node 16 and host computer 24 discussed in the preceding paragraphs will now be described with reference to FIG. 4. In a communication system 11, a host computer 24 comprises hardware (HW) 38 including a communication interface 40 configured to set up and maintain a wired or wireless connection with an interface of a different communication device of the communication system 11. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 11 further includes a network node 16 provided in a communication system 11 and including hardware 58 enabling it to communicate with the host computer 24 and with the WDs 22*a* and WD 22*b*. The hardware 58 may include a communication interface 60 for setting up and maintaining a wired or wireless connection with an interface of a different communication device of the communication system 11, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 11 and/or through one or more intermediate networks 30 outside the communication system 11.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include group management unit 34 which is configured to discover WDs that are members of a group and send to the WDs that are members of the group discovery complete message. Also, the processor 70 of the network node 16 may implement some or all of the functions of the application server 32 which is configured to provide a group IP and destination L2 ID for the group.

The communication system 11 further includes the WD 22*a* already referred to. The WD 22*a* may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22*a* further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22*a* may further comprise software 90, which is stored in, for example, memory 88 at the WD 22*a*, or stored in external memory (e.g., database, storage array, network storage device, etc.) accessible by the WD 22*a*. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22*a* and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22*a*. The processor 86 corresponds to one or more processors 86 for performing WD 22*a* functions described herein. The WD 22*a* includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22*a*.

In some embodiments, the inner workings of the network node 16, WD 22*a*, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22*a* via the network node 16, without explicit reference to any intermediary devices and the precise routing of messages via these devices. Network infrastructure may determine the routing, which it may be configured to hide from the WD 22*a* or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22*a* and the network node 16 is in accordance with the teachings of the embodiments described throughout this disclosure. One or more of the various embodiments improve the performance of OTT services provided to the WD 22*a* using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22a, in response to variations in the measurement results. The measurement procedure and/or the network functionality for reconfiguring the OTT connection 52 may be implemented in the software 48 of the host computer 24 or in the software 90 of the WD 22a, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22a. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22a, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22a to a network node 16. In some embodiments, the WD 22a is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

WD 22b may be in radio communication with the WD 22a, the network node 16 and other objects that have a radio transceiver and processing circuitry. For example, the other objects may include electronic equipment, vehicles, WDs held by persons, WD 22a, etc. WD 22b includes, therefore, a radio interface 94 and processing circuitry 96. The radio interface 94 may be as described above with respect to radio interface 82. The processing circuitry 96 may be as described above with respect to processing circuitry 84. The memory 98 may be as described above with respect to memory 88. The processor 100 may be as described above with respect to processor 86, optionally including in some embodiments, a group management unit that is as described above with respect to group management unit 34. The WD 22b may be in communication with the WD 22a on the side link 102 between radio interface 82 and radio interface 94.

Although FIGS. 3 and 4 show various "units" such as group management unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an example method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 7:
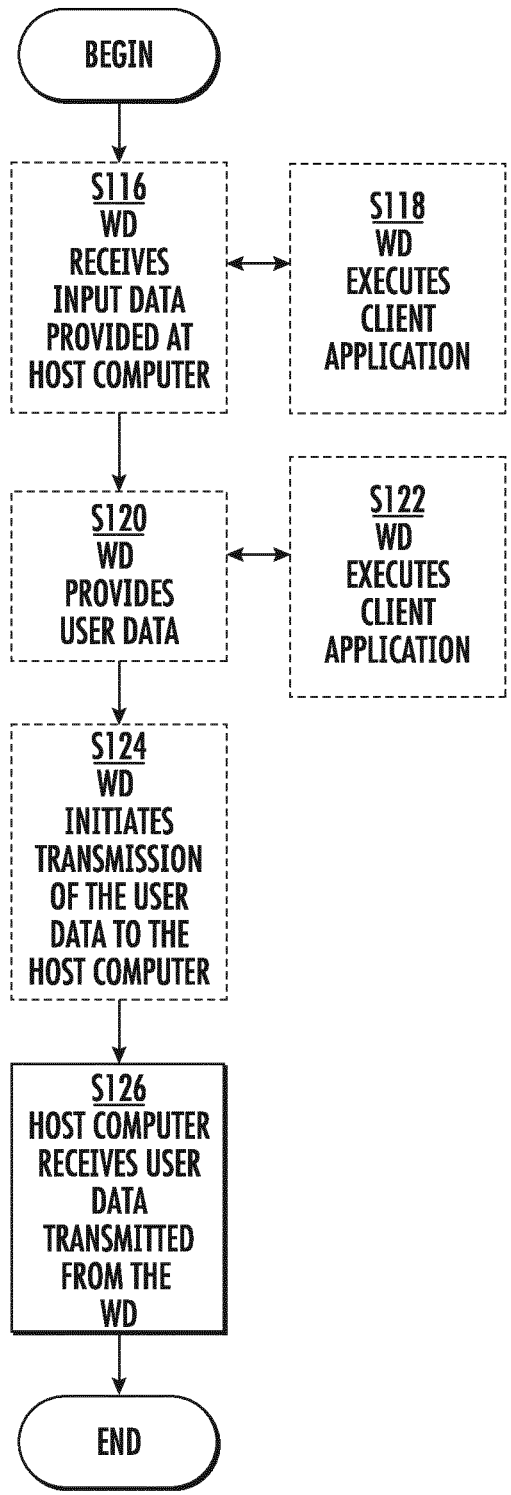
FIG. 7 is a flowchart illustrating example methods implemented in a communication system including a host computer, a network node and a wireless device for receiving user data from the wireless device at a host computer according to some embodiments of the present disclosure.

FIG. 7 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 8:
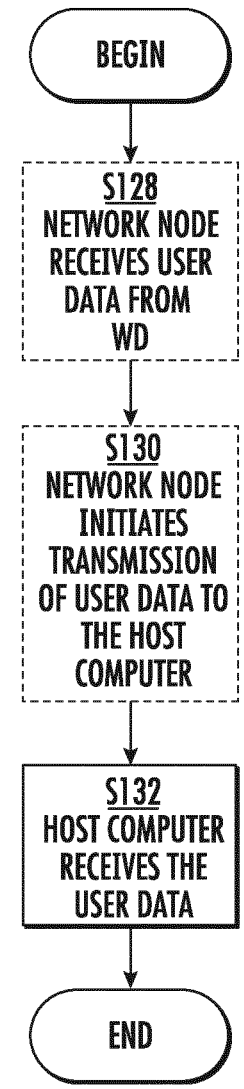
FIG. 8 is a flowchart illustrating example methods implemented in a communication system including a host computer, a network node and a wireless device for receiving user data at a host computer according to some embodiments of the present disclosure.

FIG. 8 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
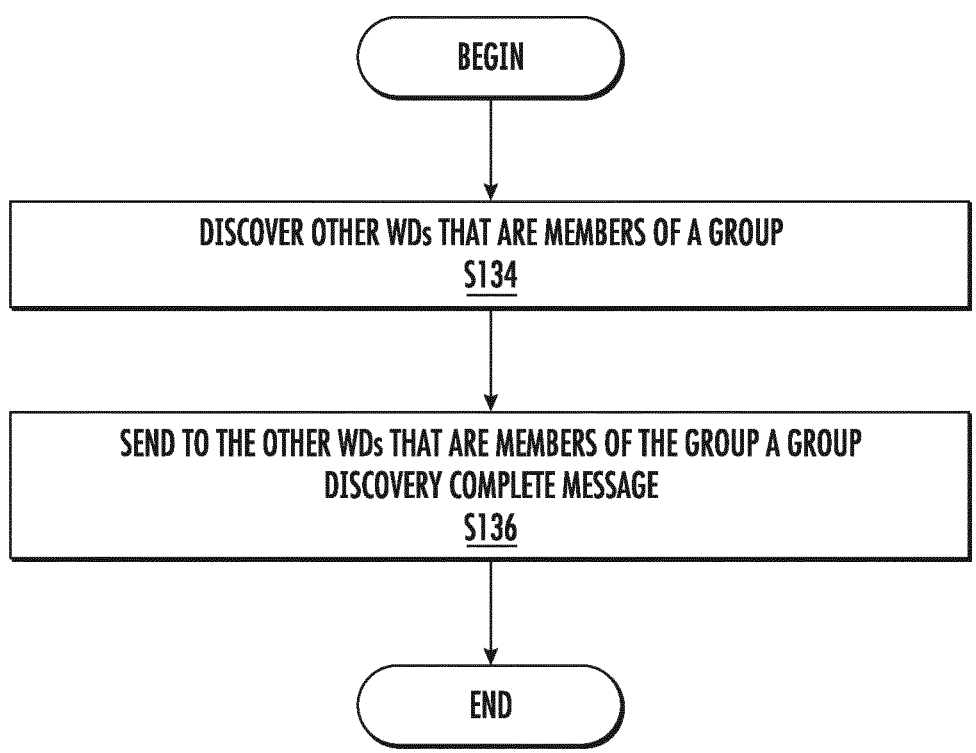
FIG. 9 is a flowchart of a first example process in a wireless device for combined group management and group communication.

FIG. 9 is a flowchart of an example process in a wireless device 22 according to some embodiments of the present disclosure. One or more blocks described herein may be performed by one or more elements of wireless device 22 such as by one or more of processing circuitry 84 (including the group management unit 34), processor 86, radio interface 82 and/or communication interface 60. Wireless device 22 such as via processing circuitry 84 and/or processor 86 and/or radio interface 82 is configured to discover other WDs 22 that are members of a group (Block S134). The process also includes sending to the other WDs 22 that are members of the group a group discovery complete message (S136).

Figure 10:
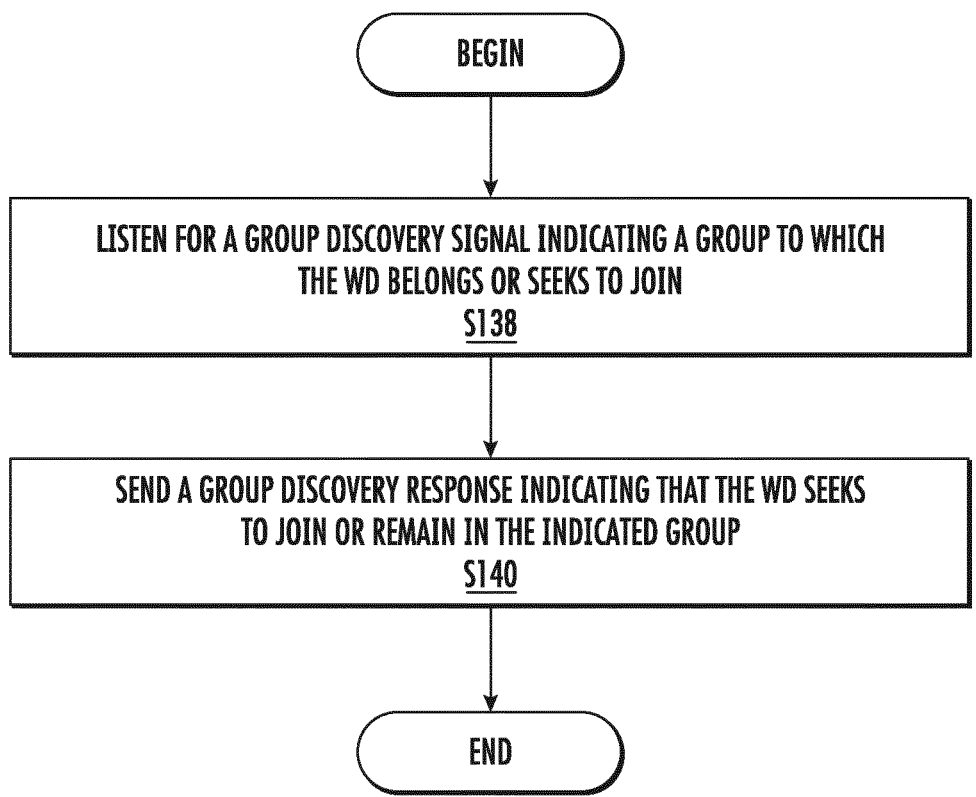
FIG. 10 is a flowchart of a second example process in a wireless device for combined group management and group communication.

FIG. 10 is a flowchart of an example process in a wireless device 22 according to some embodiments of the present disclosure. The steps of the process may be performed by radio interface 82 and/or processing circuitry 84. The process includes listening for a group discovery signal indicating a group to which the WD 22 belongs or seeks to join (Block S138), and sending a group discovery response indicating that the WD 22 seeks to join or remain in the indicated group (Block S140).

Having described the general process flow of arrangements of the disclosure and having provided examples of hardware and software arrangements for implementing the processes and functions of the disclosure, the sections below provide details and examples of arrangements for performing group management for V2X and proximity based services (ProSe) groupcast communications.

Figure 11:
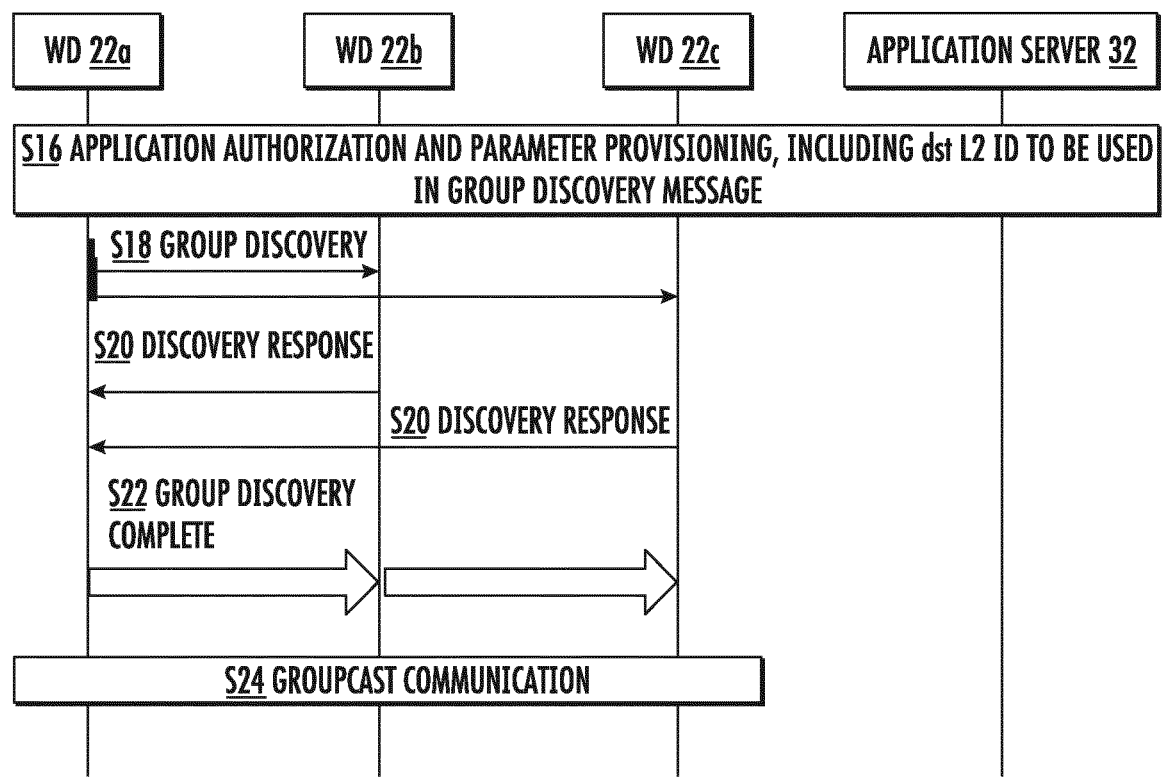
FIG. 11 is a diagram of steps in a combined group management and group communication procedure according to principles set forth below.

Referring once again to the drawing figures, there is shown in FIG. 11 an example combined group management and group communication procedure. In FIG. 11, the WDs 22a, 22b and 22c may be configured to facilitate V2X and ProSe. For example, WD 22a may be moving in a vehicle or be fixed and be in communication with other WDs that are mobile or fixed. In step S16, WDs 22a, 22b and 22c perform an application authorization routine and provide parameters to the application server 32. In some embodiments, the functions of the application server 32 can be performed by the processing circuitry 68 and/or 84 in network node 16 and WD 22, respectively. In other embodiments, the application server 32 may be a device separate from the network node 16 and WD 22, but accessible via one of more of the core network 14 and intermediate network 30. The destination Layer 2 (L2) ID, e.g., Open Systems Interconnection (OSI) Layer 2, for the application may also be provided by the WD 22a in step S16. The WD 22a may use the L2 ID in the group discovery message, and WD 22b and WD 22c will listen on the L2 ID. For example, the WD 22a may be a vehicle and WD 22b or WD 22b may be contained in a vehicle, electronic equipment, cell phone or other wireless device, such as any of the devices 4, 6, 8 and 10 when configured according to principles set forth herein. In step S18, the WD 22a sends a group discovery message which may include an application ID, a WD 22a application ID, a group ID, a destination L2 ID used for the groupcast message of this group, Internet Protocol (IP) addresses used for the groupcast message, quality of service (QOS) related parameters and security related parameters. Note that the WD 22a may contact the application server 32 to get the group IP and destination L2 ID for this group. Alternatively, the WD 22a can generate the group ID and destination L2 ID. Whether WD 22a does this generating may be decided by the application. In step S20, the WD 22b and WD 22c want to join the group, and therefore send a group discovery response, which includes the application ID, the application ID of the WD, the group ID and security related parameters. In step S22, WD 22a sends a message using groupcast to indicate the completion of the group discovery. WD 22a may use the destination L2 ID for the application in the message sent by the WD 22a. The message optionally includes the group member list, depending on the application.

Note that before or during step S22, WD 22b and WD 22c may already start to receive a message with the destination L2 ID for the group. A timer may be implemented by processing circuitry 68 and/or 84, such that if WD 22b and/or WD 22c do not receive any message with the corresponding destination L2 ID, they will clear a state for the group. The WD 22a may also send a group cancellation message after step S18 (group discovery) to cancel the group management and communication procedure. Note that, in some embodiments, the group discovery complete message can be a new PC5 signaling message. In step S24, the groupcast communication is sent. Alternatively, the group discovery complete message can be the groupcast data message.

Also note that although only three WDs 22 are shown in FIG. 11, there may be any number of WDs 22 in an actual implementation. Thus, the WD 22a, or any other WD 22, may discover more than two other WDs 22 that are members of a group.

According to one aspect, a WD 22a is configured to communicate with other wireless devices 22b, 22c. The WD 22a includes a radio interface 82 and/or processing circuitry 84 configured to discover the other WDs 22b, 22c that are members of a group and send to the other WDs 22b, 22c that are members of the group a group discovery complete message.

According to this aspect, in some embodiments, the discovering and the sending are performed in a same application layer. In some embodiments, the group discovery complete message includes a list of the members of the group. In some embodiments, the processing circuitry 84 is further configured to determine when a group discovery response message corresponding to a group discovery message is received within a predetermined time after sending the group discovery message. In some embodiments, the radio interface 82 is further configured to send a group cancellation message to cancel the discovering. In some embodiments, the group discovery message is included in a groupcast data message. In some embodiments, the processing circuitry 84 is further configured to receive discovery response messages from the other wireless devices 22b, 22c.

According to another aspect, a method implemented in a WD 22a, includes discovering other WDs 22b, 22c that are members of a group and sending to the other WDs 22b, 22c that are members of the group a group discovery complete message.

According to this aspect, in some embodiments, the discovering and the sending are performed in a same application layer. In some embodiments, the group discovery complete message includes a list of the members of the group. In some embodiments, the method further includes determining, via the processing circuitry 84, when a group discovery response message corresponding to a group discovery message is received within a predetermined time after sending the group discovery message. In some embodiments, the method includes sending, via the radio interface 82, a group cancellation message to cancel the discovering. In some embodiments, the group discovery message is included in a groupcast data message. In some embodiments, the method also includes receiving discovery response messages from the other wireless devices 22b, 22c.

According to yet another aspect, a WD 22b is configured to communicate with another device 22a. The WD 22b includes a radio interface 94 and/or processing circuitry 96 configured to listen for a group discovery signal indicating a group to which the WD 22b belongs or seeks to join, sending a group discovery response indicating that the WD 22b seeks to join or remain in the indicated group, and receiving a group discovery completion message.

According to this aspect, in some embodiments, when the WD 22b does not receive a group discovery completion message within a predetermined time after the WD 22b sends the group discovery message, the WD 22b will clear a state for the indicated group. In some embodiments, the processing circuitry 96 is further configured to discover other WDs that are members of another group different from the group to which the WD 22b belongs or seeks to join. In some embodiments, the radio interface 94 and/or processing circuitry 96 is further configured to receive a cancellation message from another WD 22a and to clear a state for the indicated group in response to the received cancellation message.

According to another aspect, a method implemented in a WD 22b includes listening, via the radio interface 94 and processing circuitry 96, for a group discovery signal indicating a group to which the WD 22b belongs or seeks to join, sending a group discovery response indicating that the WD 22b seeks to join or remain in the indicated group receiving a group discovery completion message.

According to this aspect, in some embodiments, the method further includes a group discovery completion message. In some embodiments, when the WD 22b does not receive a group discovery message within a predetermined time after the WD 22b sends the group discovery response, the WD 22b will clear a state for the indicated group. In some embodiments, the method further includes discovering other WDs that are members of another group different from the group to which the WD 22b belongs or seeks to join. In some embodiments, the method also includes receiving a cancellation message from another WD 22a and to clear a state for the indicated group in response to the received cancellation message.

According to yet another aspect, a computer program product embodied in a non-transitory computer readable medium is provided. The computer readable medium stores computer code executable by a processor to cause the processor to: discover wireless devices, WDs, (22b, 22c) that are members of a group, send to the WDs (22b, 22c) that are members of the group a group discovery complete message.

According to this aspect, in some embodiments, the group discovery complete message includes a list of the members of the group. In some embodiments, the computer code is further executable by the processor to cause the processor to determine when a group discovery response message corresponding to a group discovery message is received within a predetermined time after sending the group discovery message. In some embodiments, the computer code is further executable by the processor to cause the processor to send a group cancellation message to cancel the discovering. In some embodiments, the group discovery message is included in a groupcast data message. In some embodiments, the computer code is further executable by the processor to cause the processor to receive discovery response messages from the wireless devices (22b, 22c).

According to another aspect, a computer program product embodied in a non-transitory computer readable medium is provided. The computer readable medium stores computer code executable by a processor to cause the processor to listen for a group discovery signal indicating a group to which a WD (22b) belongs or seeks to join, send a group discovery response indicating that the WD (22b) seeks to join or remain in the indicated group, and receive a group discovery complete message.

According to this aspect, in some embodiments, the computer code is further executable by the processor to cause the processor to clear a state for the indicated group when the WD (22b) does not receive a group discovery completion message within a predetermined time after the WD (22b) sends the group discovery response. In some embodiments, the computer code is further executable by the processor to cause the processor to discover other WDs that are members of another group different from the group to which the WD (22b) belongs or seeks to join. In some embodiments, the computer code is further executable by the processor to cause the processor to receive a cancellation message from another WD (22a) and to clear a state for the indicated group in response to the received cancellation message.

Some embodiments may include one or more of the following:

Embodiment A1. A wireless device (WD) configured to communicate with another device having a radio interface and/or processor, the WD being configured to, and/or comprising a radio interface and/or processing circuitry configured to:
discover WDs that are members of a group; and
send to the WDs that are members of the group a group discovery complete message.

Embodiment A2. The WD of Embodiment A1, wherein the discovering and the sending are performed in a same application layer.

Embodiment A3. The WD of Embodiment A1, wherein the group discovery complete message includes a list of the members of the group.

Embodiment A4. The WD of Embodiment A1, wherein the processing circuitry is further configured to determine if a message having a destination L2 ID for the group is received within a predetermined time.

Embodiment A5. The WD of Embodiment A1, wherein the radio interface is further configured to send a group cancellation message to cancel the discovering.

Embodiment A6. The WD of Embodiment A1, wherein the group discovery message is included in a groupcast data message.

Embodiment B1. A method implemented in a wireless device (WD), the method comprising
discovering WDs that are members of a group; and
sending to the WDs that are members of the group a group discovery complete message.

Embodiment B2. The method of Embodiment B1, wherein the discovering and the sending are performed in a same application layer.

Embodiment B3. The method of Embodiment B1, wherein the group discovery complete message includes a list of the members of the group.

Embodiment B4. The method of Embodiment B1, further comprising determining if a message having a destination L2 ID for the group is received within a predetermined time.

Embodiment B5. The method of Embodiment B1, further comprising sending a group cancellation message to cancel the discovering.

Embodiment B6. The method of Embodiment B1, wherein the group discovery message is included in a groupcast data message.

Embodiment C1. A wireless device (WD) configured to communicate with another device having a radio interface and/or processor, the WD being configured to, and/or comprising a radio interface and/or processing circuitry configured to:
listen for a group discovery signal indicating a group to which the WD belongs or seeks to join; and
send a group discovery response indicating that the WD seeks to join or remain in the indicated group.

Embodiment C2. The WD of Embodiment C1, wherein the radio interface and/or processing circuitry is configured to receive a group discovery completion message.

Embodiment C3. The WD of Embodiment C1, wherein, when the WD does not receive a group discovery signal indicating the group within a predetermined time, the WD will clear a state for the indicated group.

Embodiment D1. A method implemented in a wireless device (WD), the method comprising:
listening for a group discovery signal indicating a group to which the WD belongs or seeks to join; and
sending a group discovery response indicating that the WD seeks to join or remain in the indicated group.

Embodiment D2. The method of Embodiment D1, wherein the radio interface and/or processing circuitry is configured to receive a group discovery completion message.

Embodiment D3. The method of Embodiment D1, wherein, when the WD does not receive a group discovery signal indicating the group within a predetermined time, the WD will clear a state for the indicated group.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device (WD) configured to wirelessly communicate with other wireless devices, the WD comprising a radio interface and processing circuitry configured to:
    discover the other WDs that are members of a group;
    send to the other WDs that are members of the group a group discovery complete message; and
    determine that a group discovery response message corresponding to a group discovery message is received within a predetermined time after sending the group discovery message.

2. The WD of claim 1, wherein the discovering and the sending are performed in a same application layer.

3. The WD of claim 1, wherein the group discovery complete message includes a list of the members of the group.

4. The WD of claim 1, wherein the radio interface is further configured to send a group cancellation message to cancel the discovering.

5. The WD of claim 1, wherein the group discovery message is included in a groupcast data message.

6. The WD of claim 1, wherein the processing circuitry is further configured to receive discovery response messages from the other wireless devices.

7. A method implemented in a wireless device (WD), the method comprising:
    discovering other WDs that are members of a group;
    sending to the other WDs that are members of the group a group discovery complete message; and
    determining that a group discovery response message corresponding to a group discovery message is received within a predetermined time after sending the group discovery message.

8. The method of claim 7, wherein the discovering and the sending are performed in a same application layer.

9. The method of claim 7, wherein the group discovery complete message includes a list of the members of the group.

10. The method of claim 7, further comprising one or more of:
    sending a group cancellation message to cancel the discovering; and
    receiving discovery response messages from the other wireless devices.

11. The method of claim 7, wherein the group discovery message is included in a groupcast data message.

12. A wireless device (WD) configured to wirelessly communicate with another device, the WD including a radio interface and processing circuitry configured to:
    listen for a group discovery signal indicating a group to which the WD belongs or seeks to join;
    send a group discovery response indicating that the WD seeks to join or remain in the indicated group;
    receive a group discovery complete message; and
    clear a state for the indicated group upon the WD not receiving a group discovery completion message within a predetermined time after the WD sends the group discovery response.

13. The WD of claim 12, wherein the processing circuitry is further configured to discover other WDs that are members of another group different from the group to which the WD belongs or seeks to join.

14. The WD of claim 12, wherein the processing circuitry is further configured to receive a cancellation message from another WD and to clear a state for the indicated group in response to the received cancellation message.

15. A method implemented in a wireless device (WD), the method comprising:
    listening for a group discovery signal indicating a group to which the WD belongs or seeks to join;
    sending a group discovery response indicating that the WD seeks to join or remain in the indicated group;
    receiving a group discovery completion message; and
    clearing a state for the indicated group upon the WD not receiving a group discovery completion message within a predetermined time after the WD sends the group discovery response.

16. The method of claim 15, further comprising one or more of:
    discovering other WDs that are members of another group different from the group to which the WD belongs or seeks to join; and
    receiving a cancellation message from another WD and clearing a state for the indicated group in response to the received cancellation message.

* * * * *